(12) United States Patent
Kundermann

(10) Patent No.: US 6,620,049 B1
(45) Date of Patent: Sep. 16, 2003

(54) DRIVE ARRANGEMENT

(75) Inventor: Wolfgang Kundermann, Schweinfurt (DE)

(73) Assignee: Mannesmann Sachs AG, Schweinfurt (DE)

( * ) Notice: Subject to any disclaimer, the term of this patent is extended or adjusted under 35 U.S.C. 154(b) by 0 days.

(21) Appl. No.: 09/693,020

(22) Filed: Oct. 20, 2000

(30) Foreign Application Priority Data

Oct. 21, 1999 (DE) .......................... 199 50 597

(51) Int. Cl.⁷ .................................. F16D 3/52
(52) U.S. Cl. ................. 464/98; 464/99; 464/51; 464/68; 60/330
(58) Field of Search ................ 464/98, 99, 100, 464/101, 51, 68; 60/330; F16D 1/08

(56) References Cited

U.S. PATENT DOCUMENTS

| 3,861,172 A | * | 1/1975 | Symann ........................ 464/93 |
| 4,318,306 A | * | 3/1982 | Fischer ..................... 403/359.4 |
| 5,586,938 A | * | 12/1996 | Schurhorster ................ 464/98 |
| 5,772,515 A | * | 6/1998 | Yamakawa et al. ......... 192/205 |
| 5,868,624 A | * | 2/1999 | Fukushima et al. ........... 464/98 |
| 6,059,662 A | * | 5/2000 | Villata et al. ................ 464/101 |
| 6,176,785 B1 | * | 1/2001 | Geislinger ................... 464/100 |
| 6,238,294 B1 | * | 5/2001 | Martinek .................... 464/100 |
| 6,302,800 B1 | * | 10/2001 | Kundermann ................ 464/98 |

FOREIGN PATENT DOCUMENTS

| DE | 198 48 253 | | 8/1999 |
| DE | 198 10 356 | | 9/1999 |
| DE | 19925913 A | * | 12/2000 |

* cited by examiner

*Primary Examiner*—Lynne H. Browne
*Assistant Examiner*—Aaron Dunwoody
(74) *Attorney, Agent, or Firm*—Cohen, Pontani, Lieberman & Pavane

(57) ABSTRACT

A drive arrangement for a motor vehicle includes a drive shaft, a coupling device, and a coupling arrangement. The drive shaft is connectable with the coupling device for transmission of force solely via the coupling arrangement. The coupling arrangement has a first toothing arrangement connectable with the drive shaft so that the first toothing arrangement is fixed with respect to rotation relative to the drive shaft and a second toothing arrangement connectable with the coupling device so that the second toothing arrangement is fixed with respect to rotation relative to coupling device. The first toothing arrangement and second toothing arrangement engage when the drive shaft and coupling device are coupled together for transmission of force.

7 Claims, 4 Drawing Sheets

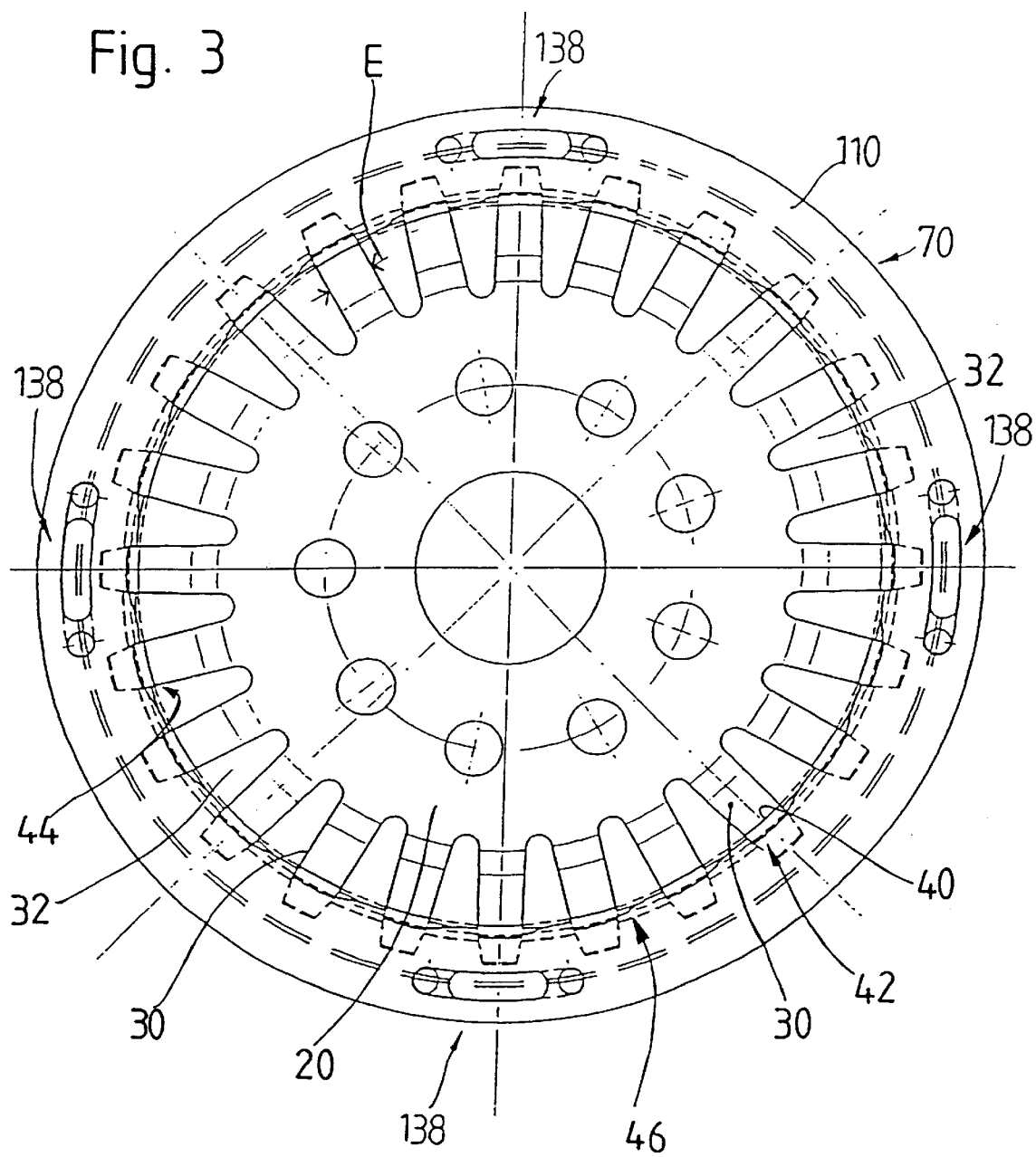

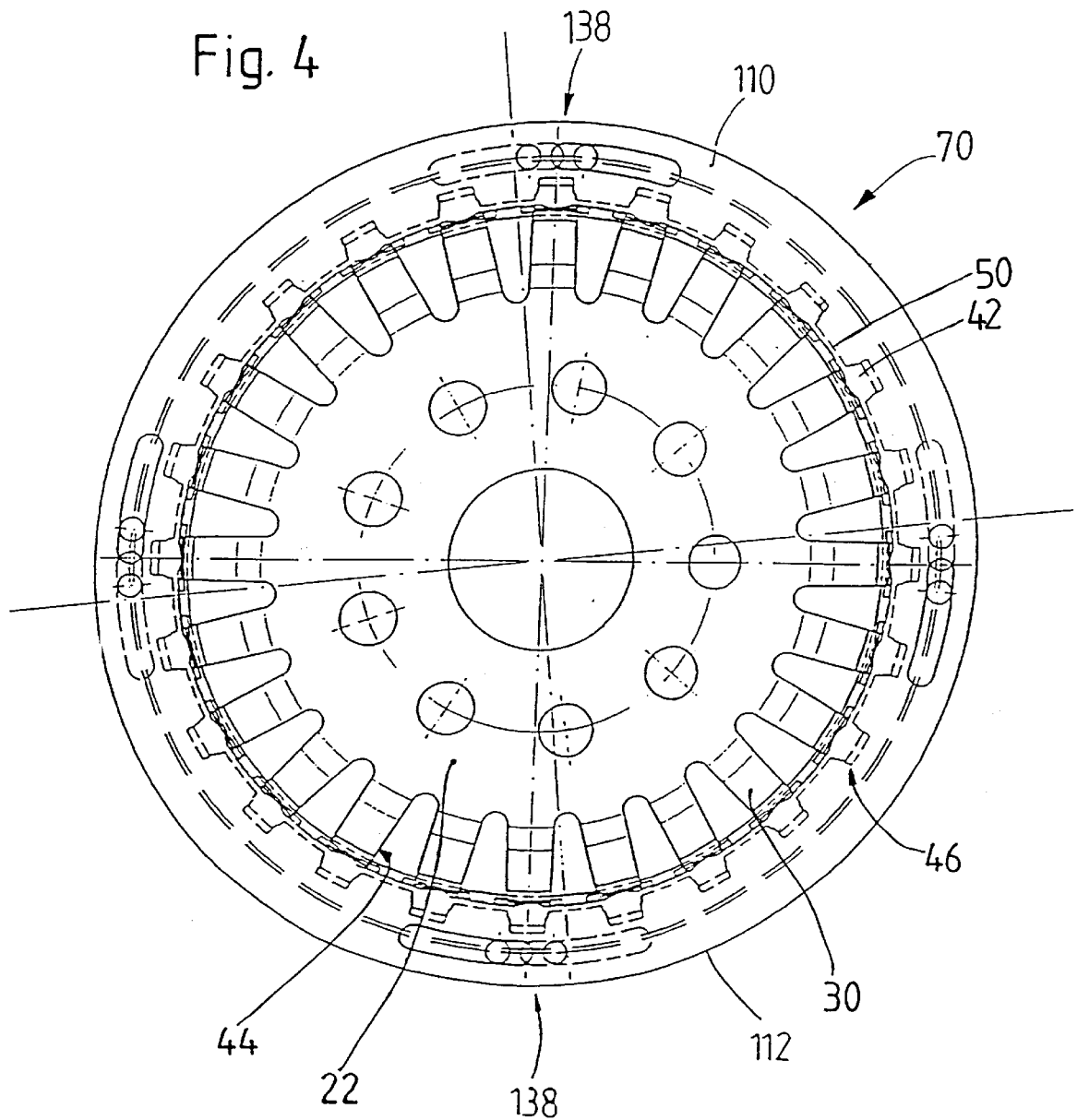

DRIVE ARRANGEMENT

BACKGROUND OF THE INVENTION

1. Field of the Invention

The present invention is directed to a drive arrangement comprising a drive shaft, a coupling device such as a hydrodynamic coupling device, and a coupling arrangement for connecting the drive shaft to the coupling device for transmission of force, wherein the coupling arrangement has a first toothing arrangement connectable with the drive shaft and a second toothing arrangement connectable with the coupling device and wherein the first toothing arrangement engages the second toothing arrangement when the drive shaft and coupling device are coupled for transmission of force.

2. Description of the Related Art

German reference DE 198 48 253 A1 discloses a known drive arrangement including a drive shaft and a torque converter to be coupled for common rotation. In this known arrangement, a torque-transmitting connection is made between the drive shaft and the torque converter, or a housing of the same, by a coupling arrangement with two toothing arrangements mesh with one another. Further, a guide pin is arranged in the center of the housing of the torque converter which engages in a guide opening formed in the drive shaft so that there is a further force-transmitting connection between the drive shaft and the torque converter for transmitting centering forces. That is, radial forces occurring between the torque converter and the drive shaft due to axial offsets or wobbling movement are contained in the region of the guide pin or guide recess.

A problem with this type of known arrangement is that the assembly of the total system is made difficult by the fact that the toothing arrangements as well as the guide pin and guide recess must be brought into respective engagement with one another and the region in which these subassemblies are located after assembly is generally covered by a transmission housing so that it is almost impossible to view the regions that must be brought into engagement with one another.

SUMMARY OF THE INVENTION

It is an object of the present invention to develop a drive arrangement including a drive shaft and a coupling device such that overcomes the problems of the prior art and is easy to assemble.

According to the present invention, this object is met by a drive arrangement comprising a drive shaft, a coupling device such as a hydrodynamic coupling device, and a coupling arrangement for connecting the drive shaft with the coupling device for the transmission of force. The coupling arrangement has a first toothing arrangement connectable with the drive shaft so that the first toothing arrangement is fixed with respect to rotation relative to the drive shaft and a second toothing arrangement connectable with the coupling device so that the second toothing arrangement is fixed with respect to rotation relative to the coupling device. The first toothing arrangement engages the second toothing arrangement when the drive shaft and coupling device are coupled for the transmission of force.

In this regard, it is further provided that the drive shaft and the coupling device are connectable with one another solely by the coupling arrangement for the transmission of force.

The present invention is based on the insight that the use of a guide projection of the type mentioned above is not compulsory. The essential forces, i.e., the driving forces, acting in circumferential direction are transmitted through the coupling arrangement. When radial forces occur between the drive shaft and the coupling device, these radial forces are parallel to the transmission of driving force in first and second circumferential regions located opposite one another with respect to the axis of rotation and are orthogonal to the transmission of driving force in third and fourth circumferential regions that are offset by 90° relative to the first and second circumferential regions. The first and second circumferential regions mentioned above, which have already been formed for the transmission of the appreciably greater driving forces, can absorb the radial forces which pretension the coupling device and the drive shaft with respect to one another because a large force transmission capacity has already been provided in this direction. Accordingly, the guide projection and the corresponding recess in the drive shaft are not required and may be dispensed with so that only the toothing arrangement needs to be engaged during the assembly process. Therefore, it is not necessary according to the present invention to ensure that the guide projection is also suitably guided into the guide recess.

To provide a coupling between the drive shaft and coupling device that is substantially free from axial forces, the first toothing arrangement or the second toothing arrangement may comprise an internal toothing and the other respective toothing arrangement may comprise an external toothing.

Furthermore, the first toothing arrangement and the second toothing arrangement may be pretensioned in mutual engagement during engagement of the first and second toothing arrangements.

In a preferred embodiment of the coupling device, at least one of the first and second toothing arrangement comprises a plurality of successive toothing segments in other of the first and second respective toothing arrangements during engagement of the first and second toothing arrangements.

To achieve the required pretensioning force without having to provide additional pretensioning members, the toothing segments may comprise at least one curvature area pretensioned relative to the other one of the first and second toothing arrangements by springing elasticity. In a preferred embodiment, the toothing segments comprise a plurality of curvature areas. The toothing segments are preferably constructed as leaf springs for this purpose.

To provide the above-mentioned transmission of forces in the circumferential direction—driving force as well as radial offsetting force—it is suggested that the toothing segments have a greater material thickness in circumferential direction than in a region of the same which is deformable in a springing-elastic manner.

The coupling device according to the present invention may comprise a hydrodynamic torque converter or a fluid coupling.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote similar elements throughout the several views:

FIG. 3 is an axial view of a coupling arrangement for use in the drive arrangement according to FIG. 1; and FIG. 4 is an axial view corresponding to FIG. 3 in which the coupling arrangement is shown in a position for canceling or for producing the coupling engagement.

DETAILED DESCRIPTION OF THE PRESENTLY PREFERRED EMBODIMENTS

Figure 1:
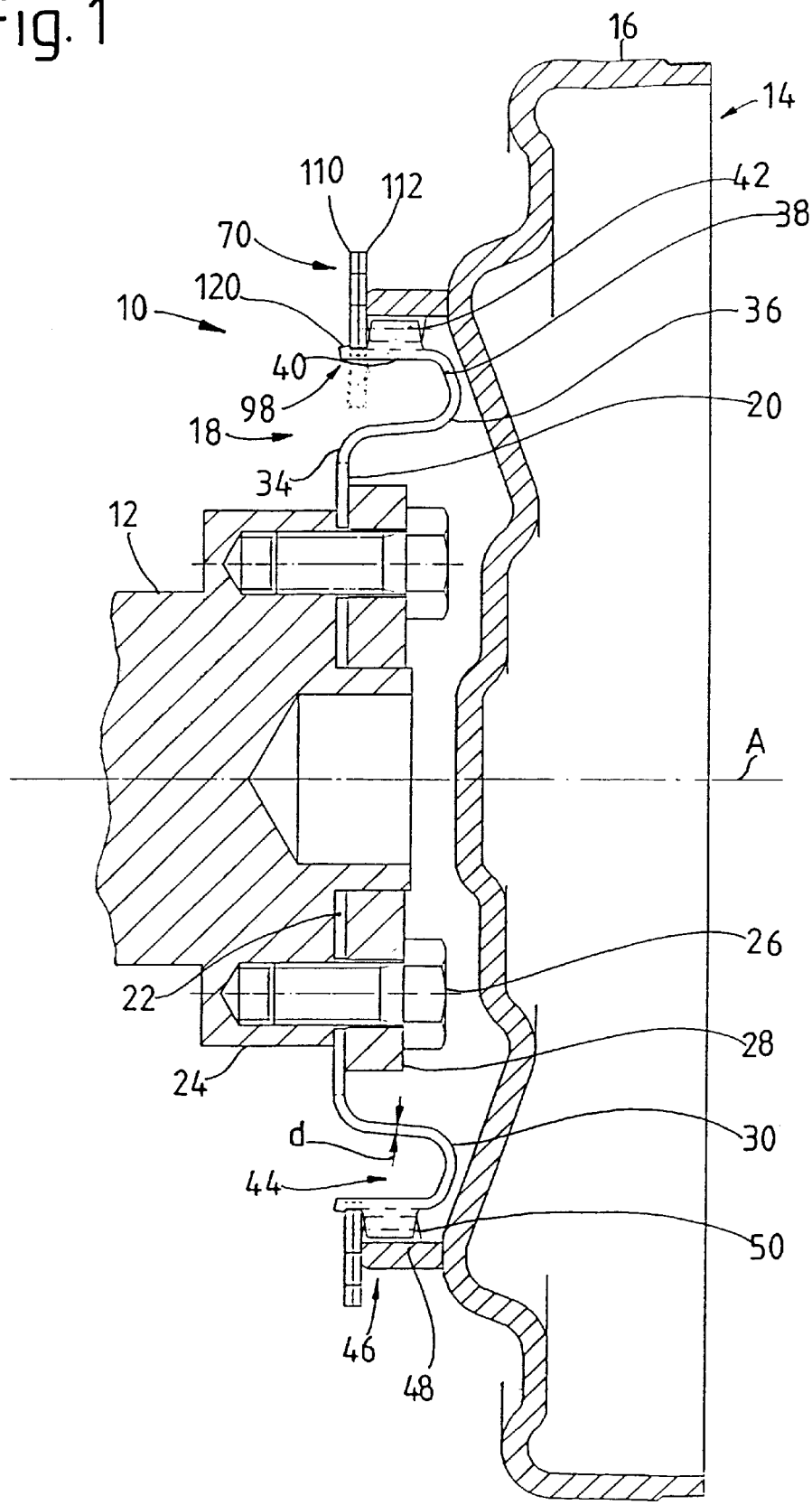
FIG. 1 is a partial longitudinal sectional view of a drive arrangement according to the present invention.

A drive system 10 according to an embodiment of the present invention is shown in FIG. 1. The drive system 10 may be arranged as part of a drivetrain in a vehicle and comprises a drive shaft 12 such as, for example, a crankshaft of an internal combustion engine and a coupling device 14 such as, for example, a hydrodynamic torque converter or a fluid coupling. Only a housing cover 16 of the coupling device 14 is shown in FIG. 1. The construction of a hydrodynamic torque converter or coupling device is known from the prior art and is not described in more detail herein.

A coupling arrangement 18 is arranged between the drive shaft 12 and the coupling device 14 to conduct a driving torque from the drive shaft 12 to the coupling device 14. The coupling arrangement 18 comprises a coupling element 20 having a radial inner annular region 22 secured to a shaft flange 24 of the drive shaft 12 by a plurality of fastening screws 26 and a fastening ring 28. The coupling element 20 further comprises a plurality of tongue-like segments 30 proceeding from the radial inner annular region 22. The coupling element 20 may, for example, be stamped from a sheet of spring steel. These tongue-like segments 30 have a circumferential extension and accordingly form respective recesses or free areas 32 between them (see FIG. 3). The tongue-like segments 30 are curved a number of times. In a first curvature area 34, the tongue-like segments 30 are bent in an axial direction toward the coupling device 14. In a second curvature area 36, the tongue-like segments 30 are bent again approximately radially outward. In a third curvature area 38, the tongue-like segments 30 are bent again axially so that end regions 40 of the tongue-like segments 30 extend approximately axially. Each of these essentially axially extending end regions 40 comprises at least one tooth 42 formed by shaping or the like. The teeth 42 formed at the different end regions 40 together form a first toothing arrangement 44 in which the teeth 42 ultimately open radially outward. The first toothing arrangement 44 will be referred to hereinafter as an external toothing 44.

A second toothing arrangement 46 is arranged at the housing cover 16 of the coupling device 14. The second toothing arrangement 46 comprises a plurality of teeth 50 projecting radially inward at a cylindrically shaped ring element 48 which may, for example, be fixedly welded to the housing cover 16. These teeth 50 of the second toothing arrangement 46 open radially inward so that the second toothing arrangement 46 is accordingly referred to hereinafter as an internal toothing 46.

In the coupling state shown in FIG. 1, the teeth 42 of the external toothing 44 are pretensioned radially outward between the teeth 50 of the internal toothing 46 due to the springing elasticity of the tongue-like segments 30. To achieve a definite and secure engagement, the teeth 42 of the external toothing 44 are tapered so that they become narrower in axial length proceeding radially outward from the end regions 40. Correspondingly, the teeth 50 of the second toothing arrangement 46 are tapered so that they become narrower in axial length proceeding radially inward. Accordingly, when the coupling state is produced the teeth 42 and 50 fully contact one another by circumferentially facing flank regions.

To achieve a secure meshing engagement, the tongue-like segments 30 may be arranged so that the end regions 40 extend at a greater inclination radially outward proceeding from the third curvature area 38 prior to achieving the coupling state so that the tongue-like segments 30 are first brought into the approximately axially extending position and held therein by mutual engagement with the inner toothing 46.

As shown in FIG. 1, an essential and independent feature of the drive arrangement 10 according to the present invention is that no guide pin engaging in a corresponding recess of the drive shaft 12 is provided at the housing cover 16 of the coupling device 14. Accordingly, it is not necessary for a guide projection to engage with an associated recess in addition to the engagement of the internal and external toothings 44, 46 when producing the coupling state. Accordingly, the connection process may be carried out in an appreciably simpler manner. Since the individual tongue-like segments 30 are constructed in a springing-elastic manner, a slight axial offset between the axis of rotation A of the drive shaft and the corresponding axis of rotation of the coupling device 14 can be compensated by a slight deformation of the coupling element in the region of the segments 30. As shown in FIGS. 1 and 3, the thickness d of the individual tongue-like segments 30 (FIG. 1) is smaller than the circumferential width E of the individual segments 30 (FIG. 3). Accordingly, the tongue-like segments 30 comprise a stiff construction in circumferential direction so that they consequently have a very high torque transmitting capacity. Since radial forces occurring during operation between the drive shaft 12 and the coupling device 14 also always run parallel to a portion of the tongue-like segments 30, these radial relative forces generated by imbalance or the like are contained in the coupling element 20. Accordingly, the coupling element 20 prevents substantial radial relative movements between the drive shaft 12 and the coupling device 14. Since the entire system can be freely adjusted essentially due to its elasticity, loading and bearing forces also remain small.

An assembly device 70 is provided for producing or canceling the coupling state of the coupling element 20. The assembly device 70 comprises two ring elements 110, 112 which are arranged proximate free ends 98 of the end regions 40 of the tongue-like segments 30 so as to be rotatable in circumferential direction. The ring elements 110, 112 are held at the coupling element 20 by a retaining projection 120. The coupling element 20 accordingly forms a preassembled unit with the ring elements 110, 112.

Figure 2:
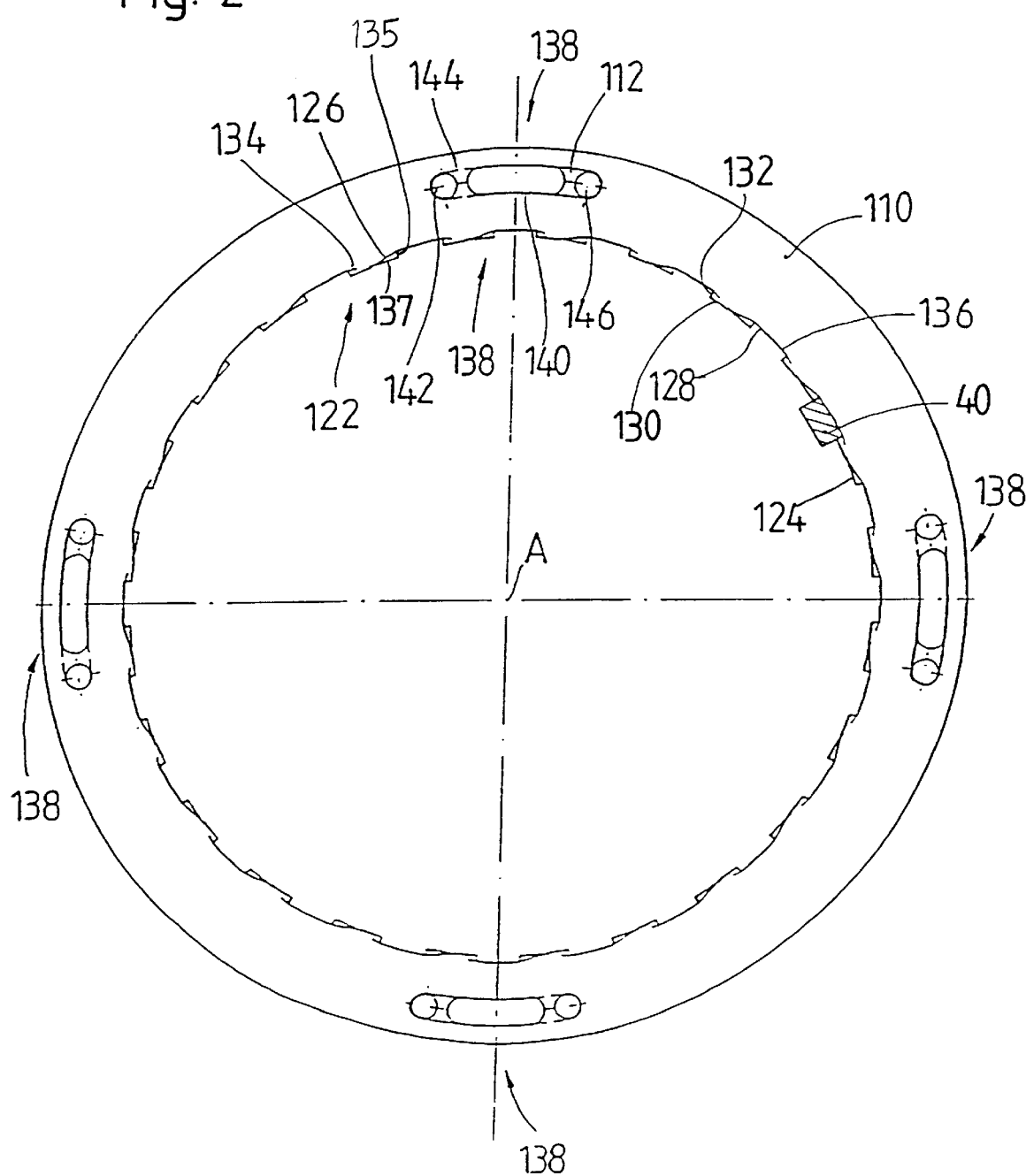
FIG. 2 is an axial view of an assembly device for use with the drive arrangement according to FIG. 1.

As shown in FIG. 2, a deformation area 122 is arranged in an inner circumferential region of each of the ring elements 110, 112. At ring element 110, this deformation area 122 includes a deformation slope 126 associated with each tooth 42 of the external toothing 44, i.e., with every segment 30, and extends in circumferential direction. The deformation area 122 also comprises regions 128 and 130, respectively arranged on circumferential sides of the deformation slope at an approximately uniform distance from the axis of rotation A. Region 130 is then followed in circumferential direction by a step 132 and then by another region 128. In a corresponding manner, the ring element 112 which is substantially concealed in FIG. 2 has, associated with each tooth 42 of the external toothing 44, a deformation slope 134 with regions 136 and 137 respectively arranged on both circumferential sides of the deformation slope 134 at an approximately uniform distance from the axis of rotation A. Region 137 is followed by a step 135 which faces the opposing circumferential direction of the step 132 of ring element 110. The two ring elements 110, 112 may be constructed identically and placed one upon the other so that they are rotatable relative to one another until the arrangement shown in FIG. 2 is achieved in which a pair of deformation slopes 126, 134 is arranged in each instance to extend in opposite directions an to overlap in the axial direction.

Each of the ring elements 110, 112 has a point of application 138 for receiving an actuating tool at a plurality of circumferential positions. The points of application 138 at the ring element 110 comprise an elongated hole 140 with an adjoining opening 142. In a corresponding manner, the points of application 138 at ring element 112 have an elongated hole 144, partially concealed, with an adjoining opening 146. Since the two ring elements 110, 112 are identically constructed and arranged in an opposing relationship, the elongated hole 140 of the ring element 110 lies partially over the elongated hole 144 of the ring element 112 and also releases or unblocks the opening 146 of the ring element 112.

The actuating tool to be used on the point of application 138 may, for example, comprise two approximately parallel pins or portions which may be moved toward one another. For purposes of actuation, these two portions of the actuating tool may be inserted into the openings 142, 146 of the ring elements 110, 112 which are accessible due to the elongated holes 140 and 144. The two ring elements 110, 112 may be rotated relative to one another in circumferential direction by moving the two portions together. Since the portions of the actuating tool penetrating the openings 142, 146 engage in the elongated holes 144 and 140 of the other respective ring element 110, 112, the ring elements 110, 112 are not prevented from rotating.

FIGS. 2 and 3 show a positioning of the ring elements 110, 112 in which the end portions 40 of the segments 30 are located, respectively, between two steps 132, 135 of the ring elements 110, 112 and accordingly occupy their position in which they are displaced the farthest radially outward position. If this state is to be canceled, for example, to engage or disengage the external toothing 44 with the internal toothing 46, the two ring elements 110, 112 are circumferentially displaced relative to one another so that the deformation slopes 126, 134 move along the end portions 40 until regions 130, 137 finally lie radially outside of the end portions 40 and the end portions 40 have accordingly been pressed radially inward. This state is shown in FIG. 4. It will be seen that the teeth 42 of the external toothing 44 have been displaced radially inward and no longer completely engage in the recesses formed between every two teeth 50 of the internal toothing 46. In this state, the two toothing arrangements 44, 46 are axially displaceable with respect to one another without being impeded by the contact force generated by the pretensioning of the segments 30.

For generating an axial relative positioning, the external and internal toothing arrangements 44, 46 may, of course, have corresponding recesses and projections so that when the teeth 42 move radially outward, a corresponding projection at a segment 30 engages in a corresponding depression or recess at the internal toothing 46, or vice versa.

It is further noted that, of course, the coupling element 20 may be fixedly connected with the coupling device 14, so that the second toothing arrangement 46 would then be provided at the drive shaft 22. Also, a wide variety of variations can be carried out in the area of the assembly device 70 to achieve easier access to the latter, also from farther radially outside. Although the toothing arrangements have been described in the preceding as external and internal toothing arrangements which engage in one another, it is also possible to produce then as axial teeth and to have the teeth, which are then open in axial direction, engage with one another by moving them together axially. However, in this case special steps must be taken to provide for a mutual axial support of the drive shaft 12 with respect to the coupling device 14.

Since there is no guide pin or the like provided in the drive arrangement according to the present invention, an easier assembly is ensured. The essential and sole transmission of force occurs via the coupling arrangement, i.e., at the meshed engagement of the internal and external toothings 44, 46. Of course, in an assembled drive system, force is coupled back via subassemblies, a chassis and the like which support the coupling device on one side and the drive shaft on the other side. However, this is not a transmission of force within the meaning of the present invention such as that occurring between the drive shaft and the coupling device by the coupling arrangement.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

I claim:

1. A drive arrangement comprising a drive shaft adapted for receiving a torsional drive force from a motor, a coupling device, and a coupling arrangement having a part adapted for receiving the torsional drive force, wherein said drive shaft is connectable with said coupling device for transmitting the torsional drive force from said drive shaft to said coupling device through said coupling arrangement, wherein said coupling arrangement comprises a first toothing arrangement connectable with said drive shaft so that said first toothing arrangement is fixed with respect to rotation relative to said drive shaft and a second toothing arrangement connectable with said part of said coupling device adapted for receiving a torsional force so that said second toothing arrangement is fixed with respect to rotation relative to said coupling device, wherein said first toothing arrangement engages said second toothing arrangement in a meshed engagement when said drive shaft and said coupling device are coupled together for the transmission of force, and wherein said coupling device comprises one of a hydrodynamic torque converter and a fluid coupling.

2. The drive arrangement of claim 1, wherein one of said first toothing arrangement and said second toothing arrangement comprises an internal toothing and the other one of said first toothing arrangement and said second toothing arrangement comprises an external toothing.

3. The drive arrangement of claim 1, wherein said first toothing arrangement and said second toothing arrangement are pretensioned in mutual engagement when said drive shaft and said coupling device are coupled together for the transmission of force.

4. The drive arrangement of claim 1, wherein at least one of said first and second toothing arrangements comprises a plurality of toothing segments arranged in circumferential succession, wherein each of said plural toothing segments is pretensioned relative to the other one of said first and second toothing arrangements.

5. The drive arrangement of claim 4, wherein each of said plural toothing segments comprises a curvature area and is pretensioned relative to the other one of said first and second toothing arrangements by springing elasticity.

6. The drive arrangement of claim 4, wherein said plural toothing segments comprise leaf springs.

7. The drive arrangement of claim 5, wherein each of said plural toothing segments comprises a circumferential width and a material thickness in a region of said curvature area which is elastically deformable, wherein said circumferential width is greater than said material thickness.

* * * * *